Sept. 24, 1940.          S. B. KURZINA, JR          2,215,965
                            HUB BRAKE
              Filed April 27, 1939          2 Sheets-Sheet 1

Witness:
Burr W. Jones

INVENTOR.
BY Stanley B. Kurzina Jr.
Clinton S. Janes
ATTORNEY.

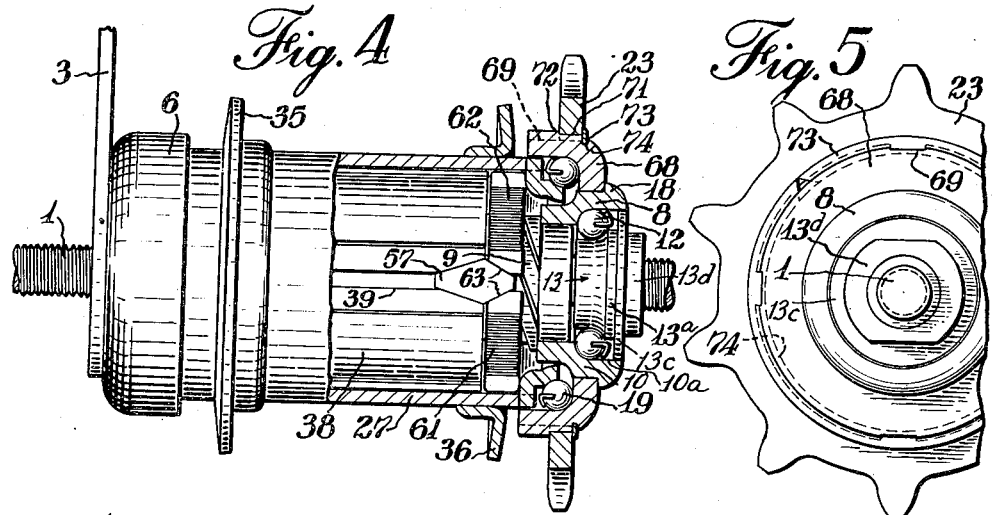
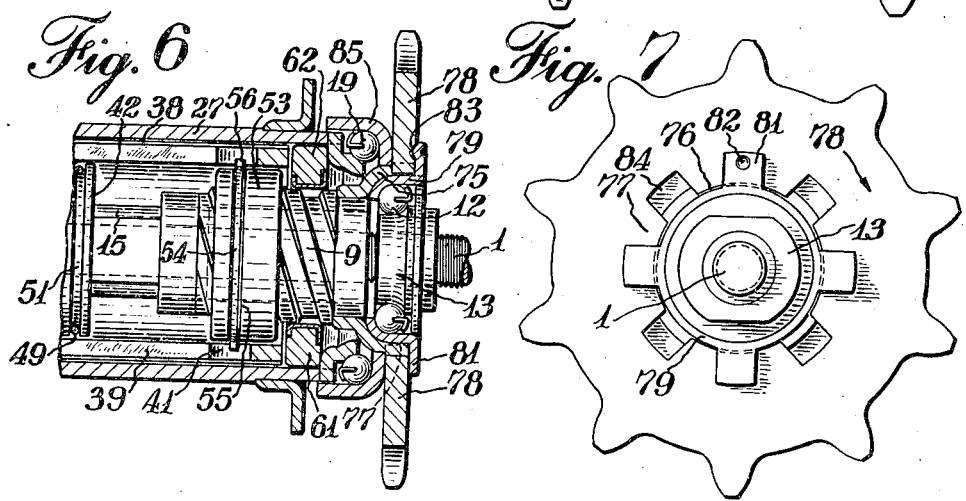
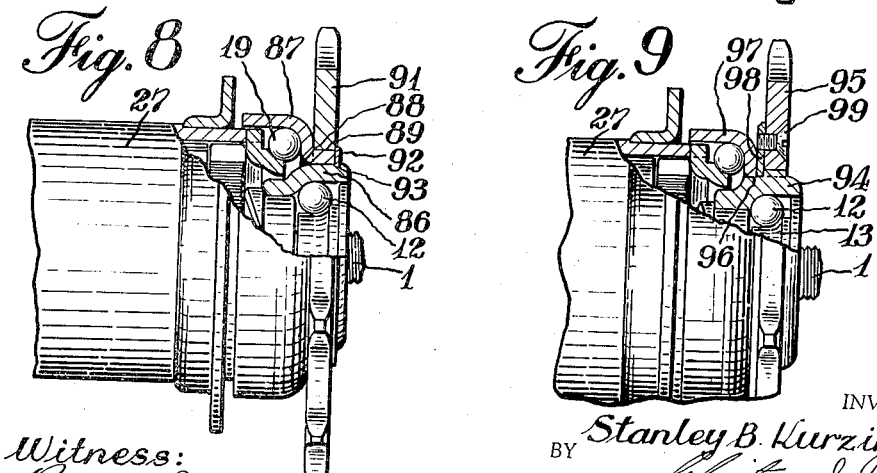

Patented Sept. 24, 1940

2,215,965

UNITED STATES PATENT OFFICE 2,215,965

HUB BRAKE

Stanley B. Kurzina, Jr., Elmira, N. Y., assignor to Bendix Aviation Corporation, South Bend, Ind., a corporation of Delaware Application April 27, 1939, Serial No. 270,353

13 Claims. (Cl. 192—6)

The present invention relates to a hub brake for velocipedes and more particularly to a coaster brake for bicycles or the like.

It is an object of the present invention to provide a novel coaster brake which is strong and light in construction and reliable and efficient in operation.

It is another object to provide such a device incorporating an expansible sleeve brake with novel anchoring and operating means therefor.

It is another object to provide such a device in which the wheel hub is formed and supported on its axle in a novel manner.

It is a further object to provide such a device embodying novel means for controlling the brake and drive clutch.

It is another object to provide such a device which is arranged for easy assembly and adjustment without special tools.

Further objects and advantages will be apparent from the following description taken in connection with the accompanying drawings in which:

Fig. 4 is a side elevation partly in section of a second embodiment of the invention;

Fig. 5 is an end view of the structure shown in Fig. 4 from the right in Fig. 4;

Fig. 6 is a detail partly in side elevation and partly in section of a third embodiment of the invention;

Fig. 7 is an end view from the right of the structure shown in Fig. 6;

Fig. 8 is a detail partly in side elevation and partly in section of another embodiment of the invention; and Fig. 9 is a view similar to Fig. 8 of a further embodiment of the invention.

Figure 1:
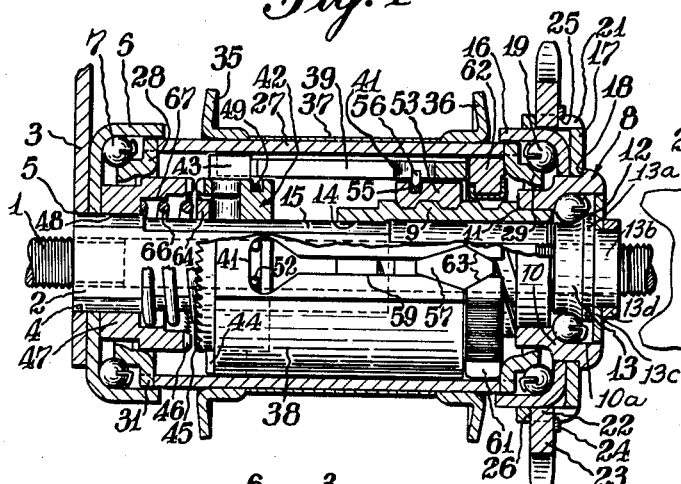
Fig. 1 is a side elevation partly in section and partly broken away of a preferred embodiment of the invention.
Figure 2:
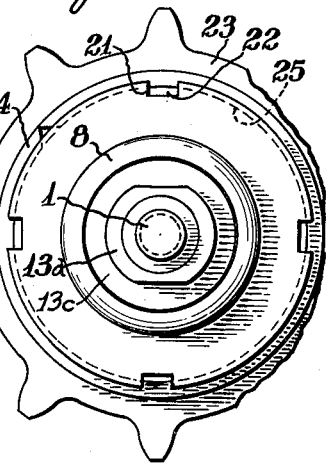
Fig. 2 is an end view thereof from the right in Fig. 1.
Figure 3:
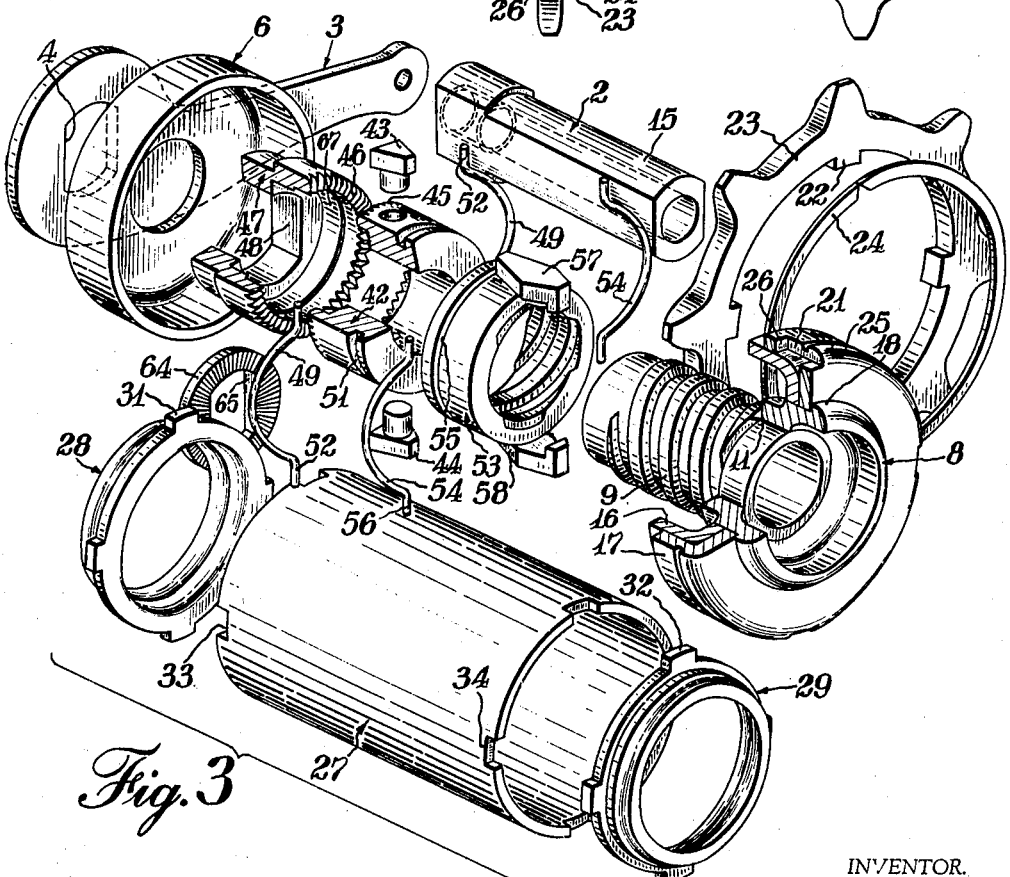
Fig. 3 is an expanded view in perspective of certain of the elements of the brake structure in disassembled relation, some of the parts being broken away to show their internal construction.

In Figs. 1, 2 and 3 there is illustrated a coaster brake structure comprising an axle 1 adapted to be mounted in the forks of a vehicle such as a bicycle, not illustrated, and threaded on both ends for the reception of clamping nuts. An anchor sleeve 2 of "double-D" cross-section is threaded on the axle 1 and has a torque arm 3 having an opening 4 conforming therewith fixed thereto in any suitable manner as by brazing as indicated at 5. A bearing cup 6 is loosely mounted on the anchor sleeve 2 adjacent the torque arm 3 and is arranged to receive anti-friction bearings 7.

A driving member 8 comprising a screw shaft 9 and a body portion forming a bearing cup 10 formed integrally therewith or brazed thereto as indicated at 11, is journalled by means of anti-friction bearings 12 on a bearing cone 13 threaded on the end of the axle opposite the torque arm 3. The bearing cone 13 is provided with a peripheral shoulder 13a and a cylindrical hub 13b. The bearing cup portion 10 of driving member 8 is provided with a cylindrical extension 10a overlying the cone hub. A closure member 13c for the bearing is mounted on the cone hub having a running fit within the cylindrical extension 10a and confined thereon against the shoulder 13a by an adjusting collar 13d fixed in any suitable manner as by brazing on the cone hub and provided with a flattened or non-circular periphery as shown in Fig. 2 in order to receive a wrench or spanner to adjust the bearing. The screw shaft 9 has a cylindrical internal bearing surface 14 piloted on the inner end of a reduced portion 15 of the anchor sleeve 2.

A bearing cup 16 and a cup-shaped mounting member 17 are fixed as by welding or brazing on the periphery of the driving member 8 in nested relation against a shoulder 18 thereon. Bearing cup 16 is arranged to receive anti-friction bearing members 19. Mounting member 17 is provided with peripheral longitudinally arranged slots 21 adapted to receive inwardly extending lugs 22 of a sprocket 23 so as to key the sprocket on the mounting member. A split ring 24 is mounted in a circumferential groove 25 in the periphery of the mounting member 17 to retain the sprocket against shoulders 26 on the mounting member 17 engaging the sides of the sprocket lugs 22.

A wheel hub 27 is provided with bearing cones 28 and 29 at its ends non-rotatably connected thereto as by means of lugs 31 and 32 entering notches 33 and 34 respectively in the ends of the hub member. Cones 28 and 29 are arranged to cooperate with the bearing members 7 and 19 to rotatably support the hub.

Spoke flanges 35 and 36 are non-rotatably mounted on the hub member 27 as by means of brazing, and are preferably spaced from each other on the hub by means of a cylinder 37 mounted on the hub.

Braking means for the hub are provided comprising a brake sleeve 38 having overlapping longitudinal slots 39 extending alternately from each end thereof and terminating in pear-shaped openings 41 adjacent the opposite ends. Means for expanding the brake sleeve and anchoring one end thereof is provided comprising a thimble 42 loosely mounted in the end of the brake sleeve and having expanding wedges 43 and 44 fixed thereto or formed integrally therewith in position to enter a pair of opposite slots 39 in the brake sleeve. Thimble 42 is provided on one side with teeth 45 arranged to engage with teeth 46 on an anchor block 47 having a "double-D" opening 48 adapted to fit the anchor sleeve 2 and prevent rotation of thimble 42 thereon.

Means for retaining the thimble 42 in the end of the brake sleeve are provided in the form of wire retaining members 49 adapted to seat in a circumferential groove 51 in the periphery of the thimble and having outturned ends 52 extending into the pear-shaped openings 41 in the brake sleeve.

The expanding means for the brake sleeve 38 further includes a supporting and actuating member 53 in the form of a nut threaded on the screw shaft 9 and retained in the opposite end of the brake sleeve from the thimble 42 by means of wire retainers 54 seated in circumferential groove 55 in the periphery of the nut 53 and having outturned ends 56 entering the pear-shaped openings 41 in that end of the brake sleeve. Nut 53 is provided with wedges 57 and 58 fixed thereto or formed integrally therewith, which wedges are arranged to enter the ends of slots 59 and cooperate with wedges 43 and 44 on thimble 42 to expand the sleeve into engagement with the interior of the hub 27 when the nut 53 is moved to the left in Fig. 1.

Means for driving the hub 27 in a forward direction from the driving member 8 is provided in the form of a pair of arcuate clutch members 61 and 62 mounted within the hub adjacent the bearing cone 29 and having beveled ends 63 adapted to be engaged by wedges 57 and 58 when the nut 53 moves to the right in Fig. 1 so as to expand the clutch rings against the interior of the hub and lock the hub to the driving member.

Means for normally maintaining the teeth 45 and 46 of thimble 42 and anchor block 47 out of engagement and for applying a light frictional drag to the brake sleeve during the initiation of the braking operation, is provided in the form of a knurled washer 64 having a "double-D" opening 65 conforming to the reduced portion 15 of the anchor sleeve 2, and pressed against the adjacent end of the thimble 42 by means of a light spring 66 seated in a counterbore 67 in the anchor block 47.

In the operation of this embodiment of the invention, forward rotation of the sprocket 23 causes rotation of the driving member 8 whereby the screw shaft 9 causes nut 53 to move to the right in Fig. 1, expanding the clutch members 61 and 62 against the interior of the hub by means of the wedges 57 and 58 whereby the hub is locked to the driving member and caused to rotate therewith. Upon cessation of rotation of sprocket 23, the overrunning of the hub 27 causes the nut 53 to back away and release the clutch members 61 and 62 whereby the hub is permitted to overrun freely.

Upon backward rotation of the sprocket 23, nut 53 moves to the left in Fig. 1, carrying the brake sleeve 38 and thimble 42 to the left, compressing spring 66 and causing engagement of the teeth 45 on the thimble with the teeth 46 on the anchor block 47 whereby the brake sleeve is prevented from rotation. Further backward movement of sprocket 23 causes the nut 53 to move farther to the left, thus expanding the brake sleeve 38 by means of wedges 57, 58, 43 and 44 whereby the sleeve is brought into frictional contact with the interior of the hub to retard its rotation. Upon release of the sprocket 23, the elasticity of the brake sleeve 38 and spring 66 causes the parts to return to their normal positions as illustrated in Fig. 1.

In the embodiment of the invention illustrated in Figs. 4 and 5, the elements of the hub brake are similar to those previously described and are similarly numbered. In this case, however, the sprocket 23 is mounted on a combined bearing cup and mounting member 68 rigidly mounted on the drive member 8 as by brazing against the shoulder 18.

The mounting and bearing member 68 is provided with longitudinal grooves 69 in its periphery and with a reduced portion 71 on which the sprocket 23 is mounted. Sprocket 23 is retained against a shoulder 72 formed by said reduced portion 71 by means of a split lock ring 73 seated in a circumferential groove 74 in the periphery of the support member 68.

The operation of this embodiment of the invention is the same as that previously described.

Figs. 6, 7, 8 and 9 show further optional sprocket mounting arrangements. In Figs. 6 and 7 the driving member is in the form of a sleeve 75 receiving the end of the screw shaft 9, expanded at its outer end and notched as indicated at 76 to receive inwardly extending lugs 77 of sprocket 78. A bearing cup 79 is rotatably mounted within the sleeve 75 in position to cooperate with the axle bearings 12 and has radially extending spring lugs 81, one or more of which has a detent protuberance 82 arranged to enter a depression 83 in the sprocket. Sprocket 78 is provided with openings 84 of sufficient depth to permit the passage of the sprocket over the lugs 81. A bearing cup 85 is fixed on the periphery of the sleeve 75 by welding or brazing, in position to cooperate with the hub bearing members 19.

In mounting the sprocket 78 on the driving member, the openings 84 in the sprocket are brought into registry with the lugs 81 of bearing cup 79. The sprocket is then passed over the lugs 81 and onto the end of the driving member 75 up against the outer bearing cup 85, the lugs 77 of the sprocket entering the notches 76 of the driving member. The inner bearing cup 79 is then rotated to place the lugs 81 out of registry with the openings 84 so as to lock the sprocket on the driving member, in which position the bearing cup is retained by means of the detent 82, 83.

In the embodiment of the invention illustrated in Fig. 8 the driving member 86 is formed interiorly as a bearing cup for the axle bearings 12 and has mounted thereon a bearing cup 87 brazed or welded thereto as indicated at 88 and arranged to cooperate with hub bearings 19. Bearing cup 87 is provided with a seat 89 for a sprocket 91, which seat is notched to receive inwardly extending lugs of the sprocket. A split lock ring 92 seated in a circumferential groove 93 in the periphery of driving member 86 serves to retain sprocket 91 on the bearing cup and mounting member 87.

In the structure illustrated in Fig. 9 driving member 94 is formed interiorly as a bearing cup to receive the axle bearings 12 and is provided with a peripheral seat for a sprocket 95, the seat and sprocket being formed with keying lugs and recesses. As here illustrated, driving member 94 is formed with a reduced smooth portion 96 adjacent the seat for the sprocket 95, and a bearing cup 97 is fixed thereon as by welding or brazing. A retaining ring 98 having interior notches conforming to the lugs of the sprocket seat, is mounted between the ends of said lugs and the bearing cup 97, being rotated so as to place its notches out of registry with the lugs on the driving member and so retained as by means of a screw 99 traversing the sprocket 95 and ring 98.

In mounting the sprocket in this embodiment of the invention, the lock ring 98 is first slid on the driving member 94 and then rotated to place the notches in the lock ring out of registry with the lugs on the driving member. Sprocket 95 is then slid on the driving member against the lock ring and retained by means of a screw or screws 99.

Although certain embodiments of the invention have been shown and described in detail, it will be understood that other embodiments are possible and various changes may be made in the design and arrangements of the parts without departing from the spirit of the invention as defined in the claims appended hereto.

What is claimed is:

1. In a coaster brake, a fixed anchor sleeve, an anchor clutch block slidably but non-rotatably mounted thereon, a torque arm fixed to the anchor sleeve serving as an abutment to confine the anchor clutch block thereon, a brake support ring slidably journalled on the anchor sleeve having a clutch face adapted to cooperate with the anchor block, yielding means normally holding the clutch members separated, a driving member having a screw shaft piloted on the anchor sleeve, an actuating member threaded on the screw shaft, an expansible brake sleeve mounted on the support ring and actuating member, and a wheel hub journalled on the anchor sleeve and driving member, said brake support ring and actuating member having means for expanding the brake sleeve into engagement with the hub responsive to compression of the parts between the actuating member and anchor block by backward rotation of the driving member.

2. In a coaster brake, a fixed anchor sleeve, an anchor clutch block non-rotatably mounted thereon, a torque arm fixed to the anchor sleeve serving as an abutment to confine the anchor clutch block thereon, a bearing cup mounted on the anchor sleeve between the anchor block and torque arm, a brake support ring slidably journalled on the anchor sleeve having a clutch face adapted to cooperate with the anchor clutch block, a driving member having a screw shaft piloted on the anchor sleeve, a bearing cup fixed on the driving member, an actuating member threaded on the screw shaft, an expansible brake sleeve mounted on the support ring and actuating member, and a wheel hub journalled in said bearing cups, said brake support ring and actuating member having means for expanding the brake sleeve into engagement with the hub responsive to backward rotation of the driving member.

3. In a coaster brake, a driving member, a bearing cup fixed thereon, a mounting cup fixed on the driving member in nested relation with the bearing cup, said mounting cup having peripheral notches, a drive sprocket surrounding and bearing on the nested cups having lugs seated in said notches, and thrust means preventing longitudinal movement of the sprocket.

4. In a coaster brake, a driving member having a peripheral shoulder, a mounting cup fixed on the driving member against said shoulder, a bearing cup nested in the mounting cup and fixed to the driving member, said mounting cup having longitudinally extending peripheral notches, a drive sprocket on the mounting cup having lugs seated in said notches, and removable thrust means confining the sprocket on the mounting member.

5. In a bicycle hub, an axle, a bearing cone threaded thereon having a cylindrical hub, a driving member having a bearing cup journalled on the cone with a hollow cylindrical extension overlying the cone hub, a bearing closure member on the cone hub, and an adjusting collar having a noncircular contour fixed on the cone hub and confining the bearing closure member thereon.

6. In a bicycle hub, an axle, a bearing cone threaded thereon having a shoulder and a cylindrical hub extending axially therefrom, a driving member having a bearing cup journalled on the cone with a hollow cylindrical extension overlying the cone hub, a bearing closure member on the cone hub in the form of a disc having a running fit in the extension of the driving member, and an adjusting collar having a noncircular contour fixed on the cone hub and confining the bearing closure member thereon against said shoulder.

7. In a coaster brake, an anchor sleeve, a driving member coaxial therewith, an actuating member threaded on the driving member, a brake supporting ring journalled on the anchor sleeve, an expansible brake cylinder mounted at its ends on the actuating member and supporting ring, and retaining means swiveled on the actuating member and supporting ring and having pivotal connection with the brake cylinder.

8. In a coaster brake, an anchor sleeve, a driving member coaxial therewith, an actuating member threaded on the driving member, a brake supporting ring journalled on the anchor sleeve, a brake cylinder mounted at its ends on the actuating member and supporting ring, said brake cylinder having diametrically arranged overlapping longitudinal slots extending from each end to permit radial expansion thereof, said actuating member and supporting ring having peripheral grooves, and retaining wires seated in said grooves and extending into the ends of said slots.

9. In a coaster brake, a driving member including a screw shaft, a collar fixed thereto, a wheel hub, means including a bearing member fixed on the periphery of the collar journalling the hub on the driving member, a sprocket splined on the collar in abutting relation to the bearing member, and an internal bearing member in the collar provided with means for holding the sprocket on the collar.

10. In a coaster brake, a driving member including a screw shaft, a collar fixed thereto, a wheel hub, means including a bearing member fixed on the periphery of the collar journalling the hub on the driving member, a sprocket splined on the bearing member, said bearing member having a circumferential shoulder abutting the sprocket, and lock means seated in the collar retaining the sprocket on the bearing member.

11. In a coaster brake, an axle, an anchor sleeve adjustably mounted thereon, an anchor block and clutch member splined on the anchor sleeve, a torque arm fixed on the outer end of the anchor sleeve, means normally urging the anchor block toward the torque arm, a bearing cup loosely mounted on the anchor sleeve between the anchor block and torque arm, and a hub barrel rotatably mounted in the bearing cup.

12. In a coaster brake, an axle, an anchor sleeve adjustably mounted thereon, an anchor block and clutch member splined on the anchor sleeve, a torque arm fixed on the outer end of the anchor sleeve, means normally urging the anchor block toward the torque arm, a bearing cup loosely mounted on the anchor sleeve between the anchor block and torque arm, a bearing cup journalled on the axle, and a cylindrical hub barrel having bearing cones at its ends rotatably mounted in the bearing cups.

13. In a coaster brake for velocipedes and the like, an axle, an anchor sleeve mounted thereon, an anchor block splined on the sleeve, an anchor arm fixed to the sleeve serving as an abutment to define the axial position of the block on the sleeve, a wheel hub surrounding the sleeve and block, a bearing member in the end of the hub, and a cooperating bearing member rotatably mounted on the sleeve and confined between the anchor arm and block.

STANLEY B. KURZINA, Jr.